United States Patent [19]

Heil et al.

[11] Patent Number: 4,648,825
[45] Date of Patent: Mar. 10, 1987

[54] PLASTIC MOLDING APPARATUS

[75] Inventors: Robert F. Heil; David S. Perry, both of Louisville, Ky.

[73] Assignee: General Electric Company, Louisville, Ky.

[21] Appl. No.: 839,371

[22] Filed: Mar. 14, 1986

[51] Int. Cl.⁴ .................. B29C 43/00; B29C 45/00
[52] U.S. Cl. .................. 425/186; 100/224; 100/918; 425/190; 425/195; 425/411; 425/451; 425/575
[58] Field of Search .......... 100/224, 918; 425/190, 425/193, 195, 406, 411, 575, 186, 451, 182, 62; 249/161

[56] References Cited

U.S. PATENT DOCUMENTS

| | | | |
|---|---|---|---|
| 3,339,757 | 9/1967 | Nagaoka | 214/16.6 |
| 3,566,441 | 3/1971 | Thorn et al. | 264/537 |
| 3,761,337 | 9/1973 | Hutter | 156/247 |
| 3,809,739 | 5/1974 | Gelin | 264/297 |
| 4,093,413 | 6/1978 | Schollhorn et al. | 425/110 |
| 4,156,962 | 6/1979 | Haller | 100/918 |
| 4,449,905 | 5/1984 | Zullig | 425/117 |
| 4,473,346 | 9/1984 | Hehl | 425/186 |
| 4,478,673 | 10/1984 | Plocher | 156/498 |
| 4,544,340 | 10/1985 | Hehl | 425/186 |
| 4,575,328 | 3/1986 | Fierkens et al. | 425/186 |

FOREIGN PATENT DOCUMENTS 0783047  11/1980  U.S.S.R. .................. 100/918

Primary Examiner—Willard E. Hoag
Attorney, Agent, or Firm—Frederick P. Weidner; Radford M. Reams

[57] ABSTRACT

Plastic molding apparatus including a horizontal molding press with two platens and a mold having an ejector mold half and a cover mold half that form a mold cavity, each mold half being secured to a platen with at least one platen movable horizontally relative to the other platen to and closed positions. The molding press has longitudinal rails along the top thereof parallel to the direction of relative movement of the platens. There is an elongated horizontal gantry structure supported solely by the press and movably secured to the rails with the longitudinal axis of the gantry structure being oriented normal to the rails and the gantry is movable along the rails. There are two arms, one of which depends from one end of the gantry and the other depends from the opposite end of the gantry, and these arms are movably secured to the gantry for back and forth movement along the longitudinal axis of the gantry. There is a load carrier secured to one of the arms and an unload carrier secured to the other arm, each load and unload carrier being movable with the respective arms. The two arms are movable toward each other when the mold is open to position the load carrier and unload carrier in the press simultaneously and the two arms may be moved away from each other to remove the load carrier and unload carrier from the press prior to closing the mold.

6 Claims, 4 Drawing Figures

PLASTIC MOLDING APPARATUS

BACKGROUND OF THE INVENTION

Plastic molding involves filling a mold cavity with a plastic material that is fluidized by heat and pressure and allowed to solidify, thus producing an object or plastic part. One of the common molding methods utilizes a molding press having two halves of a mold attached to two platens of the press, one of which is moved relative to the other by a hydraulic ram. The platens are heated such as by steam or electricity to supply heat to the mold. The cavities are filled with a predetermined amount of plastic material either in pellet form or preforms such as rolled SMC material and pressure is applied to bring the platens and mold halves together. The heat and pressure fluidize the plastic material as the mold is slowly closed. In many cases the molding press is horizontal which means that the two platens carrying the mold halves are movable horizontally relative to each other to open and closed positions. There are generally two types of plastic materials, thermosets and thermoplasts. In the case of thermosets the material "sets up" or cures with the application of heat, while in the case of thermoplasts they require cooling for complete solidification. In plastic molding processes utilizing a horizontal press it is desirable to have the preform plastic material inserted into the mold cavity and have the finished molded product removed from the mold at the same time while the platens carrying the mold halves are in the open position. With this kind of an arrangement the cycle time for successive molding operations is shortened, thus allowing increased capacity for the molding press.

Molding operations have used gantry supported robots to remove molded objects or parts from the mold when the platens of the press are open but heretofore the gantry support has been mounted on the floor which obstructs equipment access to the press and there has been no provision for loading the mold at the same time as the objects or parts that have been molded are being removed from the mold.

It is desirable that the floor area around horizontal molding presses be clear of fixed structures such as gantry supports so that press service equipment may be moved around and in close proximity to the molding press to remove the molds and replace them or for any other type of press maintenance that may be necessary. Wheeled equipment such as fork lifts are often required to maneuver in and around the press in order to periodically maintain and modify the press and the molds contained therein.

By this invention the above desirable characteristics of a horizontal plastic molding press operation including simultaneous loading and unloading the mold and maintaining an unobstructed floor area around the press are accomplished and in doing so, several other advantages attributed to this invention are also accomplished.

SUMMARY OF THE INVENTION

Plastic molding apparatus including a horizontal molding press with two platens and a mold having an ejector mold half and a cover mold half that form a mold cavity, each mold half being secured to a platen with at least one platen movable horizontally relative to the other platen to open and closed positions. The molding press has longitudinal rails along the top thereof parallel to the direction of relative movement of the platens. There is an elongated horizontal gantry structure supported solely by the press and movably secured to the rails with the longitudinal axis of the gantry structure being oriented normal to the rails and the gantry is movable along the rails. There are two arms, one of which depends from one end of the gantry and the other depends from the opposite end of the gantry, with the arms being movably secured to the gantry for back and forth movement along the longitudinal axis of the gantry. There is a load carrier secured to one of the arms and an unload carrier secured to the other arm with each load and unload carrier being movable with the respective arms. Means are provided to move the two arms toward each other when the mold is open to position the load carrier and unload carrier in the press simultaneously and there are means to move the two arms away from each other and remove the load carrier and unload carrier from the press prior to closing the mold.

BRIEF DESCRIPTION OF THE DRAWINGS

With reference to the accompanying drawing.

DESCRIPTION OF THE PREFERRED EMBODIMENT

Figure 1:
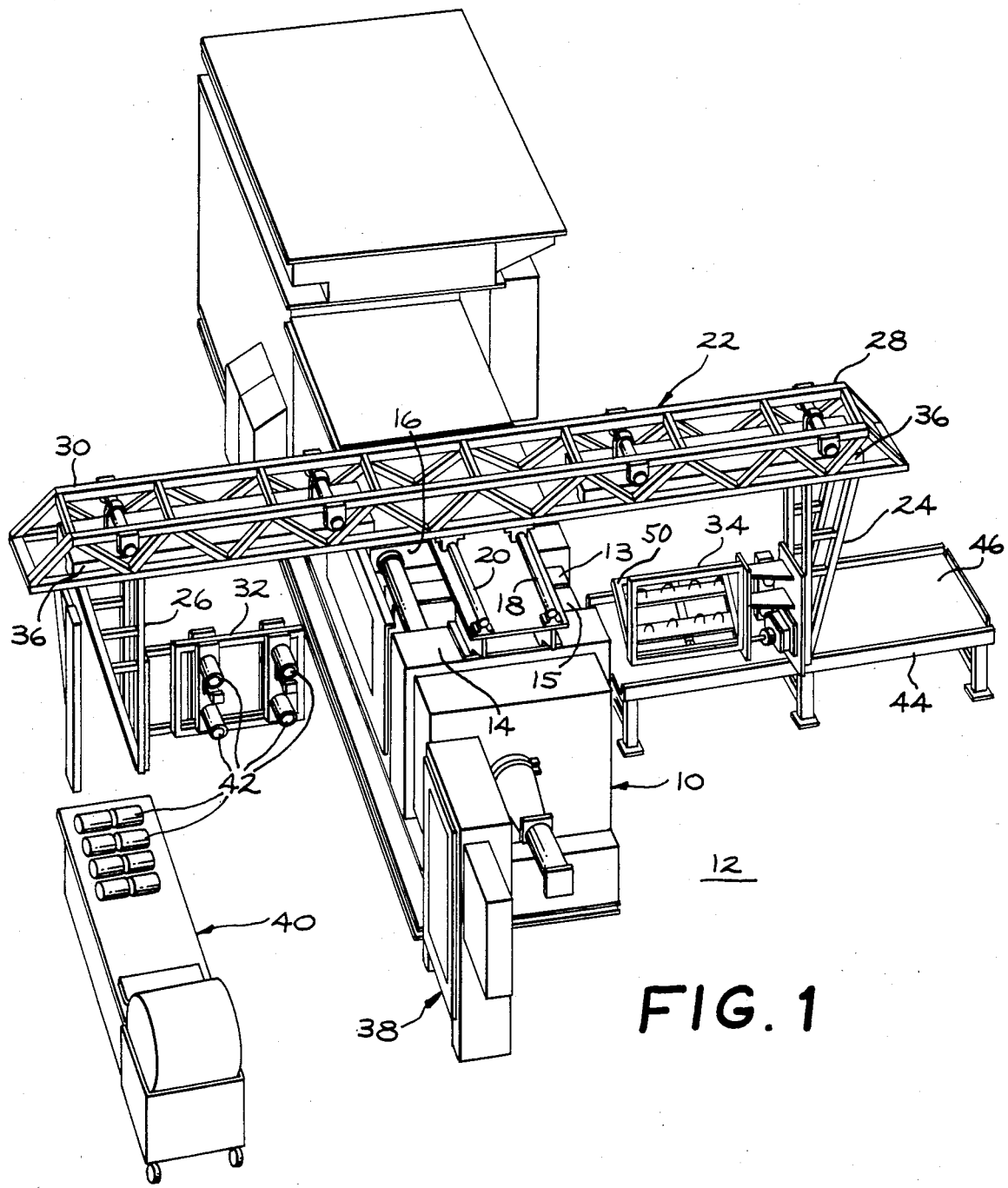
FIG. 1 is a perspective view of the plastic molding apparatus of the present invention showing the press in its closed position.

With reference to accompanying drawings, there is shown a plastic molding press 10 which is mounted on a factory floor 12 and is of the horizontal type wherein there are two platens 14 and 16 with at least one of the platens being movable horizontally relative to the other to open and closed positions. A mold 11 has an ejector mold half 13 and a cover half 15 that form a mold cavity, each mold half being secured to a platen with at least one platen movable horizontally relative to the other platen to open and closed positions. The platens 14 and 16 are shown in the closed position in FIG. 1 and the open position in FIGS. 2–4. Located on the top and secured to the molding press 10 are two parallel spaced rails 18 and 20 which have their longitudinal axis parallel to the direction of movement of the platens 14 and 16 to their open and closed positions.

Figure 2:
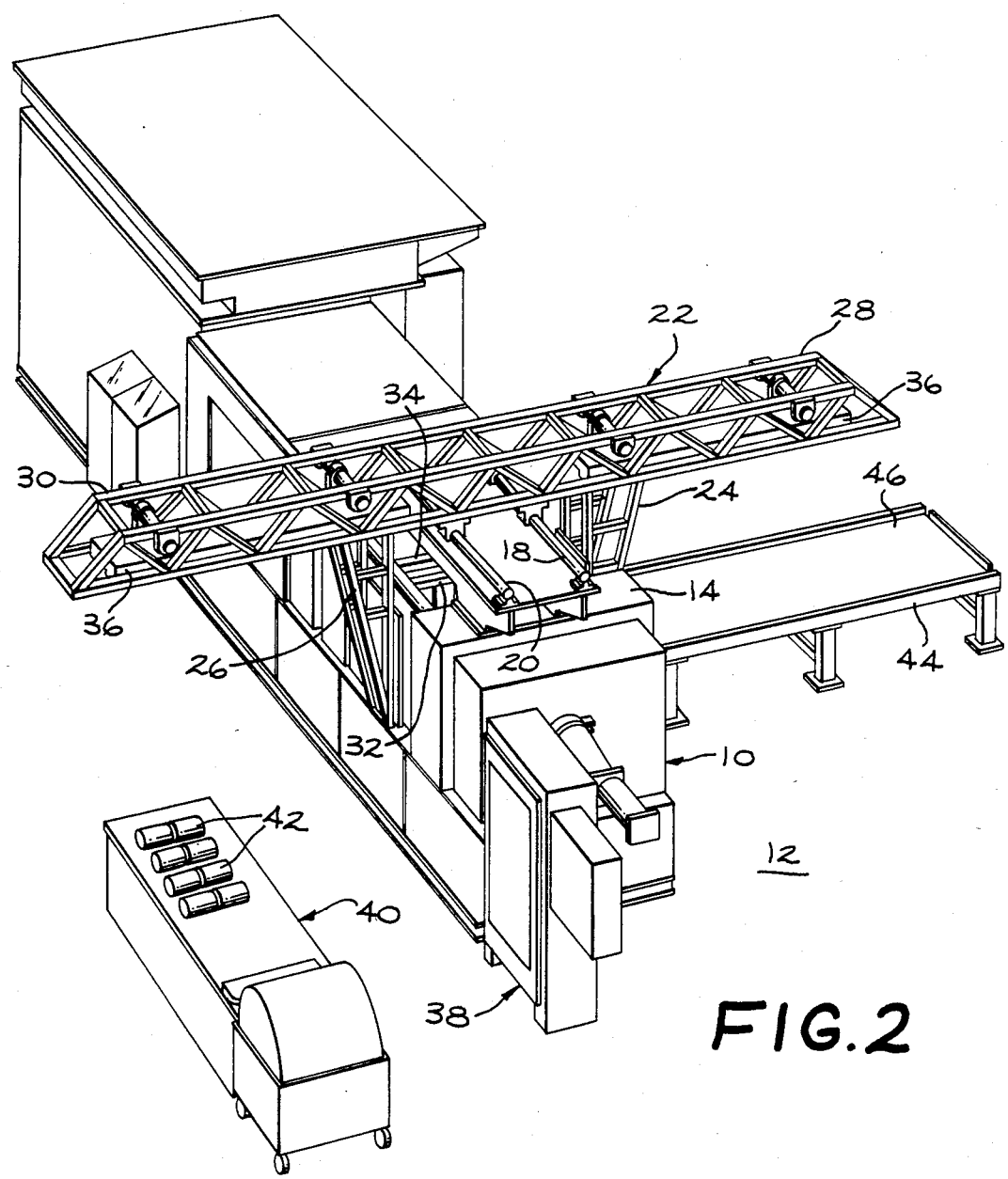
FIG. 2 is a view similar to FIG. 1 but showing the press of the plastic molding apparatus in its open position.
Figure 3:
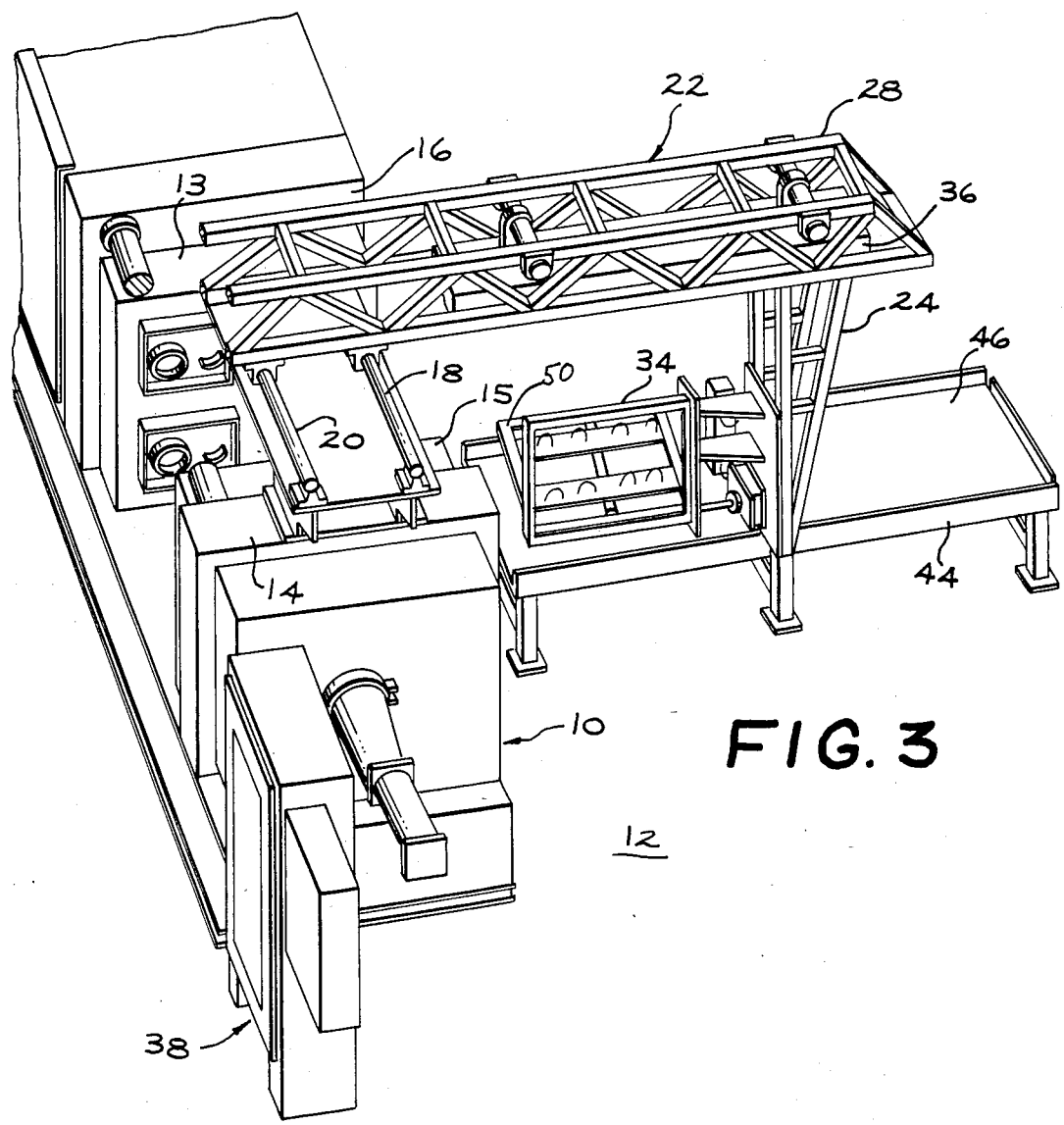
FIG. 3 is a partial view similar to FIG. 1 showing the press of the plastic molding apparatus in the open position just after unloading the mold.
Figure 4:
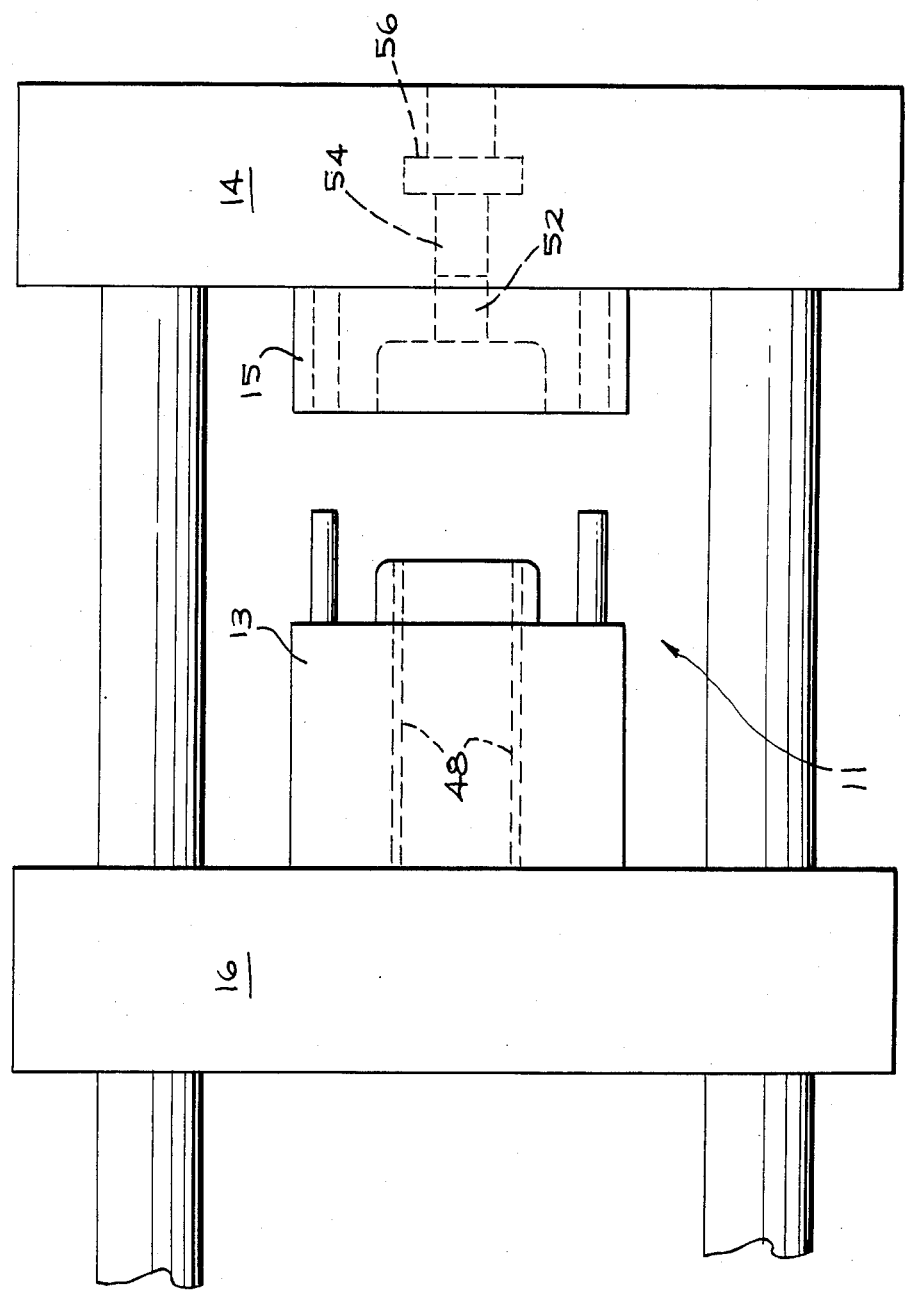
FIG. 4 is a side elevational view of a portion of the press in its open position showing one of the molds in the press.

An elongated horizontal bridge-like framework or gantry 22 is supported solely by the press 10 and is movably secured to the rails 18 and 20. The gantry has its longitudinal axis oriented normal to the longitudinal axis of the rails 18 and 20 and the gantry is movable along the rails. As can be seen in the drawing, the gantry extends outwardly in both directions a substantial distance away from the molding press 10. Two arms 24 and 26, one of which depends downwardly from one end 28 of the gantry and the other depends downwardly from the opposite end 30 of the gantry respectively. These arms are movably secured in any suitable manner to the gantry for back and forth movement along the longitudinal axis of the gantry. There is a load carrier 32 secured to arm 26 and an unload carrier 34 secured to arm 24, and both the load and unload carriers are movable with the arms 24 and 26 respectively along the gantry. The load and unload carriers have end-of-arm tooling suitable to perform the function intended relative to the load and unload operations and this tooling may be easily replaced as need be to adapt to another molding operation. There are means indicated generally as 36 to move the two arms 24 and 26 toward each other when the mold is open to position the load carrier and unload carrier in the press simultaneously. The means to move the arms may be any suitable arrangement and in the preferred embodiment this would involve a pneumatic system located within a box-like structure having an arrangement that would move the arms back and forth on a track at the bottom of the box-like structure along the gantry at the appropriate times depending upon the position of the platens of the press during operation of the press. Details of the means to move the arms are not specifically described as various structural moving means may be employed and they are in the realm of ordinary mechanical skill and availability. Several such arrangements are said commercially and easily adaptable to perform the intended function. As in any molding press operation, it is conceivable that the control and operation of the press may be by a controller 38 which, for example, would signal the means to move the two arms 24 and 26 toward each other when the platens of the press are in the open position so that the load carrier 32 and unload carrier 34 are introduced into the press between the platens when the mold is in the open position. FIG. 3 shows the press open just prior to a signal from the controller to the means to move the arms that would cause the arms to move toward each other and enter the space between the open mold halves. The controller may also signal the means to move the two arms along the gantry when it is time to close the press and by appropriate signals to the means to move the arms outwardly from inside the press between the molds and take up a position as shown in FIG. 1. Again, by appropriate signal when the load carrier and unload carrier are removed from within the press the platens carrying the mold halves may be closed.

The plastic molding apparatus shown in the drawings relates to a transfer molding system wherein preforms 42 of SMC plastic material are prepared as shown at station 40 and these preforms are placed on the the load carrier 32 when the arm and load carrier are in the position withdrawn from the press as shown in FIG. 1. In the case of this plastic molding apparatus four mold cavities are being utilized and therefore four preforms 42 are shown placed on the load carrier 32 for introduction into the press when the platens are opened. The unload carrier 34 is a vacuum pneumatic system which is commonly used to grip finished molded objects from the ejection half of the mold when the platens are opened. When the mold is opened, ejector pins 48 (FIG. 4) are extended to contact and move the molded part away from the ejector mold half whereupon pneumatically operated suction cups on the unload carrier 34 grip the molded part. Unload carrier 34 removes the parts or objects from the ejector mold half and delivers them to a conveyor table 44. When the unload carrier 34 is withdrawn from the press as shown in FIG. 1, the unload carrier 34 attached to arm 24 has a portion 50 that may be rotated 90° to the vertical so that the finished molded parts or objects are parallel to the top 46 of the conveyor table 44 whereupon the pneumatic vacuum system will release the finished molded parts and they will be deposited onto the top 46 of the conveyor table for subsequent delivery to an appropriate work station for which these parts have been molded. While the finished molded parts are being ejected from the ejector half of the mold, the load carrier 32 carrying with it preforms 42 of the plastic material are inserted into the shot chambers 52 of the mold cavities (in the case of the preferred embodiment there are four cavities) of the stationary cover mold half 15. As is the usual arrangement in such molding apparatus, the shot chamber has a plunger 54 actuated by a shot cylinder 56 to help distribute the plastic material of the preform throughout the mold cavity when the mold is in its closed position.

It will be understood that when the mold platens are in the open position the unload carrier 34 and the load carrier 32 may be in the press simultaneously so that both the operation of removing the finished molded object from the ejector mold half 13 and the operation of charging the mold cavities in the cover mold half 15 with preforms 42 are accomplished at the same time, thus reducing the cycle time of the molding operation. Heretofore, these operations were not done simultaneously but separately, one after the other, thereby requiring more time for the molding cycle.

The preferred embodiment of the plastic molding apparatus shown in the drawing may in effect be an automatic sequence molding operation and the only manual work being done to produce the finished molded object is to manually load the preforms 42 onto the load carrier 32 when it is withdrawn from the platens of the press and in the position as shown in FIG. 1.

The preferred embodiment of the plastic molding apparatus may for instance be a 1500 or 2500 ton press, which normally requires heavy equipment to make set up changes such as replacing the molds and general maintenance of the interior of the press such as the platens, etc. It is important that access be easily obtainable to the interior of the press by having the floor space around the press relatively free of any structures that would prevent maneuvering of fork lifts and other equipment necessary to work on the interior of the press. As can be seen by this invention, with the load and unload carriers being operated from an overhead gantry which is secured solely to the press there are no obstacles preventing access to the interior of the press. The conveyor table merely sets on the floor and is easily removable from its position near the press. Even the preform station 40 may, if need be, be moved away from the press as it only sets on the floor. This ease of access to the interior of the press is particularly true since in the preferred embodiment it is contemplated that the load carrier 32 and unload carrier 34 may be easily removable from the arms 24 and 26 respectively. These carriers may be substituted with other carriers, making change-over of the press and the part or object to be molded quite easy. Moreover, it will be noted that with the gantry 22 being movably mounted to the rails 18 and 20, the gantry carrying with it arms 24 and 26, if need be, may be moved in a direction parallel to the rails a distance sufficient to allow easy access to the interior of the press when the platens are open.

While there has been shown and described a specific embodiment of the invention, it will be understood that it is not limited thereto and it is intended by the appended claims to cover all such modifications as fall within the true spirit and scope of the invention.

What is claimed is:

1. Plastic molding apparatus comprising:
   a horizontal molding press with two platens and a mold having an ejector mold half and a cover mold half that form a mold cavity, each mold half being secured to a platen with at least one platen movable horizontally relative to the other platen to open and closed positions, said molding press having longitudinal rails along the top thereof parallel to the direction of relative movement of the platens,
   an elongated horizontal gantry structure supported solely by the press and movably secured to the rails, said gantry structure being oriented normal to the rails and movable along the rails,
   two arms, one of which depends from one end of the gantry and the other depends from the opposite end of the gantry, said arms being movably secured to the gantry for back and forth movement along the longitudinal axis of the gantry,
   a load carrier secured to one of the arms and an unload carrier secured to the other arm, each load and unload carrier being movable with said arms,
   means to move the two arms toward each other when the mold is open to position the load carrier and unload carrier in the press simultaneously, and
   means to move the two arms away from each other and remove the load carrier and unload carrier from the press prior to closing the mold.

2. The plastic molding apparatus of claim 1 wherein the load carrier and unload carrier have replaceable end-of-arm tooling.

3. The plastic molding apparatus of claim 2 wherein the load carrier has end-of-arm tooling for loading charges of plastic material into the mold and the unload carrier has end-of-arm tooling for removal of the plastic molded parts from the other mold.

4. The plastic molding apparatus of claim 1 wherein the two arms are independenly movable along the longitudinal axis of the gantry.

5. The plastic molding apparatus of claim 1 wherein the gantry is movable along the rails sufficient to remove the two arms depending therefrom from the open mold.

6. The plastic molding apparatus of claim 1 wherein there are two rails spaced equal distance from a vertical plane through the central longitudinal axis of the molding press.

* * * * *